US012618379B2

(12) United States Patent
Suzuki et al.

(10) Patent No.: US 12,618,379 B2
(45) Date of Patent: May 5, 2026

(54) CONTROLLER FOR INTERNAL COMBUSTION ENGINE

(71) Applicant: TOYOTA JIDOSHA KABUSHIKI KAISHA, Toyota (JP)

(72) Inventors: Yuki Suzuki, Kariya (JP); Mina Tachibana, Toyota (JP); Tomihisa Tsuchiya, Toyota (JP)

(73) Assignee: TOYOTA JIDOSHA KABUSHIKI KAISHA, Toyota (JP)

(*) Notice: Subject to any disclaimer, the term of this patent is extended or adjusted under 35 U.S.C. 154(b) by 0 days.

(21) Appl. No.: 18/929,651

(22) Filed: Oct. 29, 2024

(65) Prior Publication Data

US 2025/0215836 A1 Jul. 3, 2025

(51) Int. Cl.

| | |
|---|---|
| ***F02D 41/38*** | (2006.01) |
| ***F02D 19/02*** | (2006.01) |
| ***F02M 21/02*** | (2006.01) |

(52) U.S. Cl.

CPC ....... *F02D 19/022* (2013.01); *F02M 21/0206* (2013.01); *F02M 21/0221* (2013.01); *F02M 21/0239* (2013.01); *F02M 21/0242* (2013.01); *F02M 21/0275* (2013.01); *F02D 19/027* (2013.01); *F02D 2200/0602* (2013.01)

(58) Field of Classification Search

CPC .. F02D 19/0623; F02D 19/021; F02D 19/022; F02D 19/023; F02D 19/024; F02D 19/025; F02D 19/026; F02D 19/027; F02D 19/0602; F02D 19/0605; F02D 19/0607; F02D 19/061; F02M 63/0225; F02M 21/0248; F02M 21/0293; F02M 57/00; F02M 63/0003; F02M 63/0005; F02M 63/0007; F02M 63/06; F02M 63/023; F02M 63/026

USPC .................................................. 701/104, 107

See application file for complete search history.

(56) References Cited

U.S. PATENT DOCUMENTS

| | | | | |
|---|---|---|---|---|
| 6,135,090 A * | 10/2000 | Kawachi ............ | F02D 41/3809 | 123/506 |
| 2005/0039724 A1 * | 2/2005 | Ishida ................ | F02M 63/0005 | 123/447 |

(Continued)

FOREIGN PATENT DOCUMENTS

| | | | |
|---|---|---|---|
| CN | 115506931 A * 12/2011 | ........... | F02M 51/061 |
| DE | 102005036780 A1 * 2/2007 | ............. | F02M 55/02 |
| ES | 2232336 T3 * 6/2005 | ......... | F02D 41/3845 |

(Continued)

*Primary Examiner* — George C Jin
*Assistant Examiner* — Teuta B Holbrook

(57) ABSTRACT

A controller is configured to control an internal combustion engine. The controller is configured to perform a fuel pressure control of adjusting a fuel pressure downstream of an electromagnetic valve in a flow direction of fuel in a fuel passage to a prescribed pressure lower than a fuel pressure upstream of the electromagnetic valve by repeatedly performing opening and closing operations of the electromagnetic valve. The controller includes processing circuitry. The processing circuitry is configured to execute a process of setting opening and closing time points of the electromagnetic valve such that a valve opening period of the electromagnetic valve during execution of the fuel pressure control overlaps with a valve opening period of the fuel injection valve.

8 Claims, 5 Drawing Sheets

(56) References Cited

U.S. PATENT DOCUMENTS

| | | | | |
|---|---|---|---|---|
| 2016/0298587 | A1 * | 10/2016 | Nakano | F02D 41/3845 |
| 2023/0193867 | A1 * | 6/2023 | Nakai | F02D 41/221 |

FOREIGN PATENT DOCUMENTS

| | | | | | |
|---|---|---|---|---|---|
| JP | 2007177664 | A | * | 7/2007 | F02D 41/3863 |
| JP | 2015113796 | A | * | 6/2015 | |
| JP | 2016121575 | A | * | 7/2016 | F02D 19/027 |
| JP | 2022-182969 | A | | 12/2022 | |

* cited by examiner

CONTROLLER FOR INTERNAL COMBUSTION ENGINE

CROSS-REFERENCE TO RELATED APPLICATIONS

This application is based upon and claims the benefit of priority from prior Japanese Patent Application No. 2023-222447, filed on Dec. 28, 2023, the entire contents of which are incorporated herein by reference.

BACKGROUND

1. Field

The present disclosure relates to a controller for an internal combustion engine.

2. Description of Related Art

For example, an internal combustion engine disclosed in Japanese Laid-Open Patent Publication No. 2022-182969 reduces the pressure of gas fuel stored in a tank to a prescribed fuel pressure before supplying the gas fuel to fuel injection valves.

SUMMARY

This Summary is provided to introduce a selection of concepts in a simplified form that are further described below in the Detailed Description. This Summary is not intended to identify key features or essential features of the claimed subject matter, nor is it intended to be used as an aid in determining the scope of the claimed subject matter.

In one general aspect, a controller is configured to control an internal combustion engine. The internal combustion engine includes a tank that stores fuel, a fuel injection valve that supplies fuel to a cylinder, a fuel passage that connects the tank to the fuel injection valve, and an electromagnetic valve that is provided in the fuel passage so as to selectively open and close the fuel passage. The controller is configured to perform a fuel pressure control of adjusting a fuel pressure downstream of the electromagnetic valve in a flow direction of fuel in the fuel passage to a prescribed pressure lower than a fuel pressure upstream of the electromagnetic valve by repeatedly performing opening and closing operations of the electromagnetic valve. The controller comprises processing circuitry. The processing circuitry is configured to execute a process of setting opening and closing time points of the electromagnetic valve such that a valve opening period of the electromagnetic valve during execution of the fuel pressure control overlaps with a valve opening period of the fuel injection valve.

The controller for the internal combustion engine can suppress pressure fluctuation of the fuel supplied to the fuel injection valve.

Other features and aspects will be apparent from the following detailed description, the drawings, and the claims.

BRIEF DESCRIPTION OF THE DRAWINGS

Throughout the drawings and the detailed description, the same reference numerals refer to the same elements. The drawings may not be to scale, and the relative size, proportions, and depiction of elements in the drawings may be exaggerated for clarity, illustration, and convenience.

DETAILED DESCRIPTION

This description provides a comprehensive understanding of the methods, apparatuses, and/or systems described. Modifications and equivalents of the methods, apparatuses, and/or systems described are apparent to one of ordinary skill in the art. Sequences of operations are exemplary, and may be changed as apparent to one of ordinary skill in the art, with the exception of operations necessarily occurring in a certain order. Descriptions of functions and constructions that are well known to one of ordinary skill in the art may be omitted.

Exemplary embodiments may have different forms, and are not limited to the examples described. However, the examples described are thorough and complete, and convey the full scope of the disclosure to one of ordinary skill in the art.

In this specification, "at least one of A and B" should be understood to mean "only A, only B, or both A and B."

In the internal combustion engine as described in BACKGROUND section, the following control may be performed as the fuel pressure control.

That is, an electromagnetic valve that selectively opens and closes a fuel passage is provided in the fuel passage that connects a tank that stores fuel to fuel injection valves, which supply fuel to cylinders. An allowable upper limit value and an allowable lower limit value are set for the target fuel pressure. If fuel injection from each fuel injection valve is performed in a state where the electromagnetic valve is closed, fuel flows out from the fuel passage downstream of the electromagnetic valve, so the fuel pressure downstream of the electromagnetic valve falls. When the downstream fuel pressure reaches a lower limit value, the electromagnetic valve is opened. When the electromagnetic valve is opened, fuel is supplied to the fuel passage downstream of the electromagnetic valve, so that the fuel pressure downstream of the electromagnetic valve increases. When the downstream fuel pressure reaches the upper limit value, the electromagnetic valve is closed.

By repeatedly performing such selective opening and closing of the electromagnetic valve, the pressure of the fuel downstream of the electromagnetic valve, which is the pressure of the fuel supplied to the fuel injection valves, is adjusted to a prescribed pressure.

However, in such fuel pressure control, a pressure fluctuation of the fuel occurs in the fuel passage downstream of the electromagnetic valve, and therefore, for example, the injection accuracy of the fuel injection valves may decrease.

Hereinafter, an embodiment of a controller for an internal combustion engine will be described with reference to FIGS. 1 to 4.

Regarding Internal Combustion Engine

Figure 1:
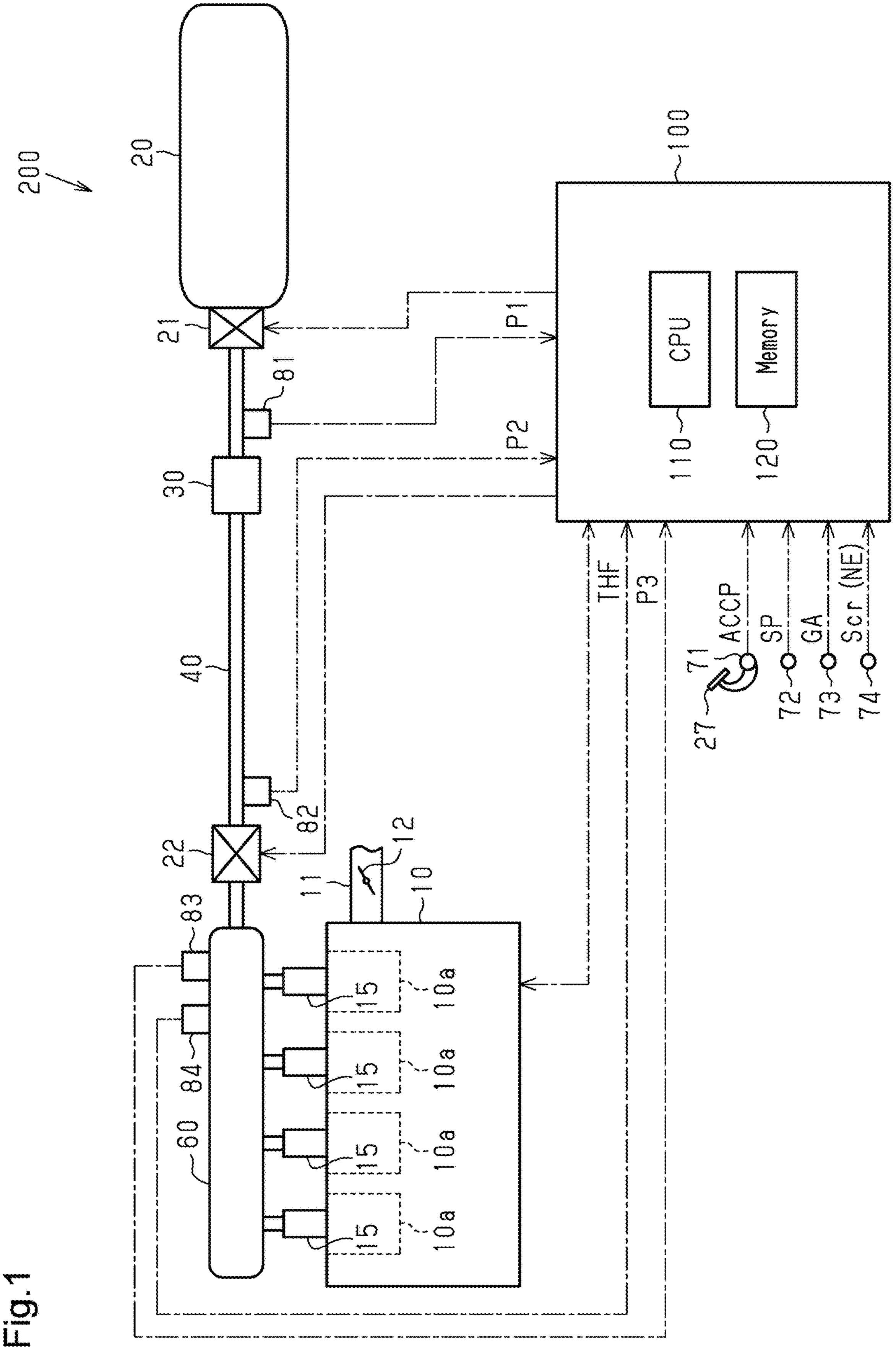
FIG. 1 is a schematic diagram of an internal combustion engine and a controller according to an embodiment.

An internal combustion engine 10 shown in FIG. 1 is mounted on a vehicle and uses hydrogen gas, which is a gaseous fuel, as a fuel.

A throttle valve 12 that adjusts an intake air amount is provided in an intake passage 11 of the internal combustion engine 10.

The fuel supply device 200 provided in the internal combustion engine 10 includes multiple fuel injection valves 15, a tank 20, a fuel pipe 40, a first shut-off valve 21, a second shut-off valve 22, a pressure reducing valve 30, and a delivery pipe 60.

The fuel injection valves 15 supply fuel to cylinders 10*a* of the internal combustion engine 10.

The tank 20 stores hydrogen gas, which is gaseous fuel, in a high-pressure compressed state.

The fuel pipe 40 connects the tank 20 and the delivery pipe 60.

The fuel injection valves 15 are connected to the delivery pipe 60. The fuel pipe 40 and the delivery pipe 60 are a fuel passage connecting the tank 20 to the fuel injection valves 15. The hydrogen gas stored in the tank 20 is supplied to the fuel injection valves 15 via the fuel pipe 40 and the delivery pipe 60.

The first shut-off valve 21, the pressure reducing valve 30, and the second shut-off valve 22 are arranged in the fuel pipe 40 in this order in a direction of fuel flow.

The first shut-off valve 21 is an electromagnetic valve arranged near an outlet of the tank 20. When the first shut-off valve 21 is open, fuel is supplied from the tank 20 to the fuel pipe 40. When the first shut-off valve 21 is closed, the supply of fuel from the tank 20 to the fuel pipe 40 is stopped.

The pressure reducing valve 30 is a mechanical pressure reducing valve that reduces the fuel pressure of the high-pressure hydrogen gas stored in the tank 20 to a prescribed pressure (for example, approximately 4 MPa) and supplies the hydrogen gas to the fuel injection valves 15.

The second shut-off valve 22 is an electromagnetic valve, and is disposed in the vicinity of the delivery pipe 60. When the second shut-off valve 22 is opened by energization, fuel is supplied to the delivery pipe 60. When the second shut-off valve 22 is closed due to the de-energization, the supply of fuel to the delivery pipe 60 is stopped.

The first shut-off valve 21 and the second shut-off valve 22 are closed while the operation of the internal combustion engine 10 is stopped. On the other hand, the first shut-off valve 21 and the second shut-off valve 22 are basically open during operation of the internal combustion engine 10.

The first pressure sensor 81 is provided in the fuel pipe 40 between the first shut-off valve 21 and the pressure reducing valve 30. The first pressure sensor 81 detects a first pressure P1 which is a fuel pressure in the fuel pipe 40 between the first shut-off valve 21 and the pressure reducing valve 30.

The second pressure sensor 82 provided in the fuel pipe 40 between the pressure reducing valve 30 and the second shut-off valve 22 detects a second pressure P2 that is the fuel pressure in the fuel pipe 40 between the pressure reducing valve 30 and the second shut-off valve 22.

A third pressure sensor 83 provided in the delivery pipe 60 detects a third pressure P3, which is a fuel pressure in the delivery pipe 60. A temperature sensor 84 provided in the delivery pipe 60 detects a fuel temperature THF which is the temperature of the fuel in the delivery pipe 60.

The controller 100 performs various types of control such as fuel injection of the internal combustion engine 10 by controlling various control targets such as the throttle valve 12, the fuel injection valves 15, the first shut-off valve 21, and the second shut-off valve 22. The controller 100 includes a memory 120 constituted by storage devices such as a CPU 110, a ROM, and a RAM. The controller 100 performs various controls when the CPU 110 executes a program stored in the memory 120.

The controller 100 refers to various values used to control the internal combustion engine 10. For example, the controller 100 refers to detection values of the first pressure sensor 81, the second pressure sensor 82, the third pressure sensor 83, and the temperature sensor 84. Further, the controller 100 refers to a detection signal of an accelerator position sensor 71 that detects an accelerator operation amount ACCP that is an operation amount of an accelerator pedal 27 operated by a driver of the vehicle on which the internal combustion engine 10 is mounted. In addition, the controller 100 refers to a detection signal of a speed sensor 72 that detects a vehicle speed SP of a vehicle on which the internal combustion engine 10 is mounted. Further, the controller 100 refers to a detection signal of an air flow meter 73 that detects an intake air amount GA of the internal combustion engine 10, and a detection signal Scr of a crank angle sensor 74 that detects a rotation angle of a crankshaft of the internal combustion engine 10.

The controller 100 calculates the engine rotation speed NE based on the detection signal Scr of the crank angle sensor 74. In addition, the controller 100 calculates an engine load factor KL based on the engine rotation speed NE and the intake air amount GA. The engine load factor KL represents the ratio of the current cylinder inflow air amount to the cylinder inflow air amount at the time of steady operation of the internal combustion engine 10 in a full load state at the current engine rotation speed NE. The cylinder inflow air amount is the amount of air entering each cylinder in the intake stroke.

Hydrogen gas, which is an engine fuel, has a wider range of a combustible air-fuel mixture than gasoline, and can be combusted even in a lean air-fuel mixture. Therefore, the controller 100 adjusts the output of the internal combustion engine 10 through the following combustion control.

That is, the controller 100 calculates a requested output Pe, which is a requested value of the engine output of the internal combustion engine 10, based on the accelerator operation amount ACCP and the like. The controller 100 sets a requested injection amount Qd based on the requested output Pe. The requested injection amount Qd is a target value of the fuel injected from one fuel injection valve 15 in one combustion cycle. Based on a target air-fuel ratio AFt and the requested injection amount Qd, the controller 100 calculates a requested air amount GAd that is a target value of the intake air amount requested for obtaining the target air-fuel ratio AFt. The target air-fuel ratio AFt of the present embodiment is a lean air-fuel ratio such as an air excess ratio $\lambda$=2.5 to 3.0, for example. Then, the controller 100 controls each fuel injection valve 15 such that an amount of fuel corresponding to the requested injection amount Qd is injected. Further, the controller 100 controls the opening degree of the throttle valve 12 so that an amount of air corresponding to the requested air amount GAd is introduced into the cylinder. In this way, in the internal combustion engine 10, the output adjustment is performed by changing the air-fuel ratio of the air-fuel mixture through the adjustment of the fuel injection amount and the intake air amount.

The controller 100 sets a fuel injection starting time point Tis and a fuel injection ending time point Tie such that an amount of fuel corresponding to the requested injection amount Qd is injected from each fuel injection valve 15. The calculation of the injection starting time point Tis and the injection ending time point Tie is well known. For example, the controller 100 sets the injection starting time point Tis and the injection ending time point Tie based on the requested injection amount Qd, the engine rotation speed NE, the third pressure P3, the fuel temperature THF, and the like. When the crank angle of the crankshaft reaches the injection starting time point Tis, the controller 100 energizes each fuel injection valve 15 to open the fuel injection valve 15, thereby starting fuel injection. When the crank angle of the crankshaft reaches the injection ending time point Tie, the controller 100 stops the energization of each fuel injection valve 15 to close the fuel injection valve 15, thereby ending the fuel injection.

Fuel Pressure Control

The controller 100 repeatedly performs selective opening and closing operations of the second shut-off valve 22, which is an electromagnetic valve, to perform fuel pressure control for adjusting the fuel pressure downstream of the second shut-off valve 22 in the fuel flow direction in the fuel pipe 40 to be lower than the fuel pressure upstream of the second shut-off valve 22. That is, the controller 100 executes the fuel pressure control such that the third pressure P3, which is the fuel pressure in the delivery pipe 60, becomes lower than the second pressure P2, which is the pressure after being reduced by the pressure reducing valve 30.

Figure 2:
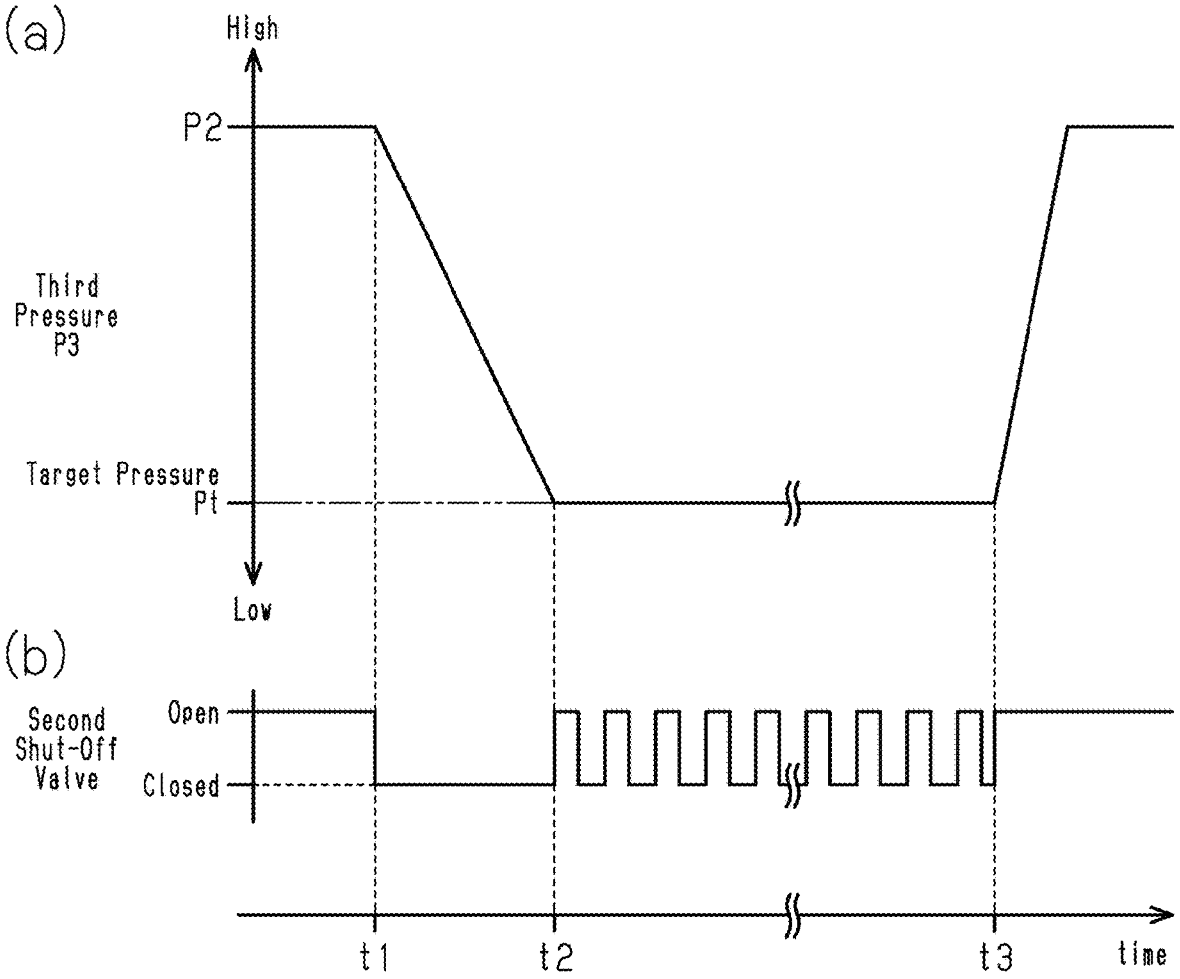
FIG. 2 is a timing diagram showing a fuel pressure control according to the embodiment, where part (a) shows changes in a third pressure, and part (b) shows an operating state of a second shut-off valve.

FIG. 2 shows an example of fuel pressure control. Part (a) of FIG. 2 shows the changes in the third pressure P3, and part (b) of FIG. 2 shows the operating state of the second shut-off valve 22.

Before time t1, the hybrid vehicle is traveling normally, and the second shut-off valve 22 is maintained in the open state. The third pressure P3 is equal to the second pressure P2, which has been reduced by the pressure reducing valve 30.

At time t1, when the internal combustion engine 10 is requested to be operated at idle, the second shut-off valve 22 is closed and the closed state is maintained. While the second shut-off valve 22 is closed, the amount of fuel in the delivery pipe 60 decreases each time fuel is injected from each fuel injection valve 15. Thus, the third pressure P3 gradually decrease. Then, at time t2, when the third pressure P3 decreases to a prescribed target pressure Pt (for example, about 1 MPa), the fuel pressure control is started in which opening and closing operations of the second shut-off valve 22 is repeatedly performed. By the execution of the fuel pressure control, the third pressure P3 is maintained at the target pressure Pt.

At time t3, when a transition from idling operation to load operation corresponding to normal vehicle driving is requested for the internal combustion engine 10, the fuel pressure control is stopped, and the second shut-off valve 22 remains in an open state. When the second shut-off valve 22 is maintained in the open state, the amount of fuel flowing into the delivery pipe 60 greatly increases compared to when the fuel pressure is controlled, so the third pressure P3 gradually increases, and finally rises to the second pressure P2.

As described above, in the present embodiment, when the requested injection amount Qd is small, for example, during idling, the third pressure P3 in the delivery pipe 60 is maintained at a low level. By performing this fuel pressure control, a small amount of fuel is accurately injected from each fuel injection valve 15.

Drive Control of Second Shut-Off Valve during Fuel Pressure Control

The controller 100 executes a process of setting the opening and closing time points of the second shut-off valve 22 such that the valve opening period of the second shut-off valve 22 during the execution of the fuel pressure control overlaps the valve opening period of each fuel injection valve 15.

Figure 3:
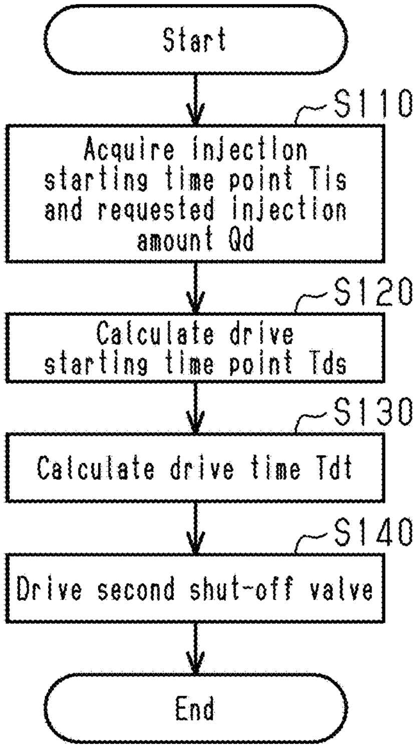
FIG. 3 is a flowchart showing a procedure of processes executed by a controller according to the embodiment.

FIG. 3 illustrates a procedure for processes executed by the controller 100. The process shown in FIG. 3 is performed by the CPU 110 executing a program stored in the memory 120 of the controller 100. The process shown in FIG. 3 is repeatedly executed during the execution of the fuel pressure control. That is, the controller 100 starts the process shown in FIG. 3 when the third pressure P3 decrease to the target pressure Pt after the idle operation is requested to the internal combustion engine 10. Then, when the internal combustion engine 10 is requested to shift from the idle operation to the load operation corresponding to the normal traveling of the vehicle, the controller 100 ends the process. In the following description, the number of each step is represented by the letter S followed by a numeral.

When this process is started, the controller 100 acquires the injection starting time point Tis and the requested injection amount Qd of each fuel injection valve 15 (S110).

Next, the controller 100 calculates the drive starting time point Tds of the second shut-off valve 22 (S120). The drive starting time point Tds is a point in time at which energization of the second shut-off valve 22 is started, and is a value represented by a crank angle. In the process of S120, the controller 100 calculates a point in time that is earlier than the injection starting time point Tis by a delay period Tdl. Then, the controller 100 substitutes the calculated point in time for the drive starting time point Tds. The delay period Tdl has the following value. That is, a prescribed time required from the start of the energization of the second shut-off valve 22 to the actual opening of the second shut-off valve 22 is set as the delay time A. The delay period Tdl is a value obtained by converting the delay time A into a crank angle based on the engine rotation speed NE at that time.

Next, the controller 100 calculates a drive time Tdt of the second shut-off valve 22 (S130). The drive time Tdt is the energization time of the second shut-off valve 22 requested for the amount of fuel passing through the second shut-off valve 22 to become the same amount as the requested injection amount Qd of each fuel injection valve 15. The controller 100 calculates the drive time Tdt based on the requested injection amount Qd, the second pressure P2, and the third pressure P3, the fuel temperature THE, and the like.

Next, the controller 100 drives the second shut-off valve 22 (S140).

In S140, when the crank angle of the crankshaft reaches the drive starting time point Tds, the controller 100 starts energizing the second shut-off valve 22 to open the second shut-off valve 22. When the drive time Tdt elapses from the start of the energization of the second shut-off valve 22, the controller 100 stops the energization of the second shut-off valve 22 to close the second shut-off valve 22, thereby terminating the fuel supply to the delivery pipe 60.

When the process of S140 is ended, the controller 100 ends the execution of this process in the current cycle.

Operation of Present Embodiment

Figure 4:
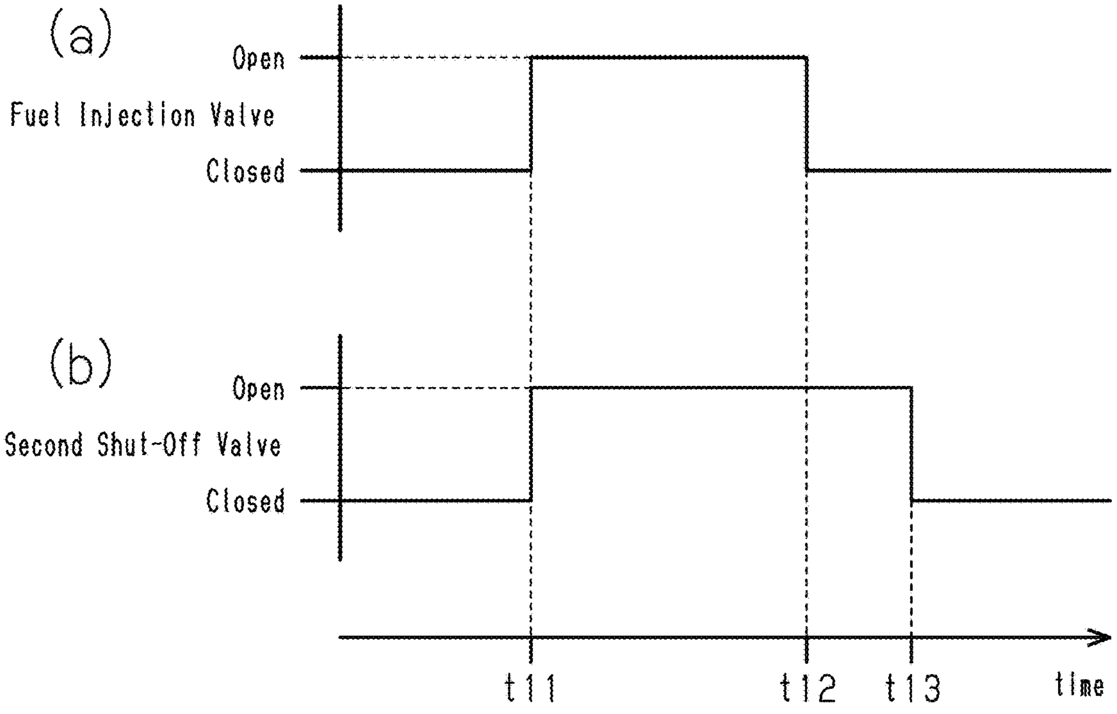
FIG. 4 is a timing diagram showing opening and closing time points of a fuel injection valve and a second shut-off valve in the embodiment, where part (a) shows the opening and closing time points of the fuel injection valve, and part (b) shows the opening and closing time points of the second shut-off valve.

FIG. 4 is a timing diagram showing the opening and closing time points of each fuel injection valve 15 and the second shut-off valve 22. Part (a) of FIG. 4 shows the opening and closing time points of each fuel injection valve 15, while part (b) of FIG. 4 shows the opening and closing time points of the second shut-off valve 22.

When the fuel injection valves 15 are opened at time t11, the second shut-off valve 22 is also opened in synchronization with the opening of the fuel injection valves 15. Then, the fuel injection valve 15 is closed at time t12.

Thereafter, when the same amount of fuel as the fuel injected during the valve opening period of the fuel injection valve 15 is supplied to the delivery pipe 60 through the second shut-off valve 22 due to the elapse of the drive time Tdt, the second shut-off valve 22 is closed.

As described above, according to the present embodiment, in the period from time t11 to time t12, the valve opening period of each fuel injection valve 15 and the valve opening period of the second shut-off valve 22 overlap with each other. Incidentally, the second shut-off valve 22 of the present embodiment is a valve in which the amount of fuel passing through the second shut-off valve 22 per unit time at the target pressure Pt while the valve is open is smaller than the amount of fuel injected by the fuel injection valve 15 per unit time during idle operation. Therefore, even if the second shut-off valve 22 is opened at the same time as the fuel injection valve 15, the closing time point of the second shut-off valve 22, which is performed at the time when the drive time Tdt elapses, is later than that of the fuel injection valve 15. Therefore, when the injection amount of the fuel injection valve 15 per unit time and the amount of fuel passing through the second shut-off valve 22 per unit time are the same, it is possible to make not only the opening time point but also the closing time point of the fuel injection valve 15 and the closing time point of the second shut-off valve 22 the same.

Advantages of Present Embodiment (1) The controller 100 executes the processing of setting the opening and closing time points of the second shut-off valve 22 such that the valve opening period of the second shut-off valve 22 during the execution of the fuel pressure control overlaps the valve opening period of each fuel injection valve 15.

Therefore, in the delivery pipe 60 which is the fuel passage downstream of the second shut-off valve 22, the outflow of the fuel due to the fuel injection from each fuel injection valve 15 and the inflow of the fuel due to the valve opening operation of the second shut-off valve 22 occur at the same time. Therefore, the decrease in the fuel pressure due to the outflow of the fuel is suppressed by the increase in the fuel pressure due to the inflow of the fuel. Therefore, the pressure fluctuation of the fuel supplied to each fuel injection valve 15 can be suppressed.

(2) The drive time Tdt, which is the valve opening period of the second shut-off valve 22, is set so that the amount of fuel injected during the valve opening period of each fuel injection valve 15 and the amount of fuel passing through the second shut-off valve 22 during the valve opening period of the second shut-off valve 22 become the same.

Therefore, in the delivery pipe 60, which is a fuel passage downstream of the second shut-off valve 22, the amount of fuel flowing out due to fuel injection from each fuel injection valve 15 is equal to the amount of fuel flowing in due to the valve-opening operation of the second shut-off valve 22. Therefore, as compared with the case where the outflow amount and the inflow amount are different from each other, it is possible to further suppress the pressure fluctuation of the fuel supplied to each fuel injection valve 15.

(3) The drive starting time point Tds, which is the opening time point of the second shut-off valve 22, is set so as to be synchronized with the injection starting time point Tis, which is the opening time point of each fuel injection valve 15.

Therefore, when the fuel injection from the fuel injection valve 15 is started, the inflow of the fuel into the delivery pipe 60 which is the fuel passage downstream of the second shut-off valve 22 is started. Therefore, a decrease in the fuel pressure associated with the start of the fuel injection can be suppressed.

Modifications

The above-described embodiment may be modified as follows. The above-described embodiment and the following modifications can be combined as long as the combined modifications remain technically consistent with each other.

In the above embodiment, when the opening and closing time points of the second shut-off valve 22 are set so that the valve opening period of each fuel injection valve 15 and the valve opening period of the second shut-off valve 22 overlap, the opening time point of the second shut-off valve 22 is set so as to synchronize with the opening time point of each fuel injection valve 15. However, it is not essential to synchronize the opening time point of the second shut-off valve 22 and the opening time point of each fuel injection valve 15, and for example, as shown in FIGS. 5 to 8, the opening and closing time points of the second shut-off valve 22 can be appropriately changed.

Figure 5:
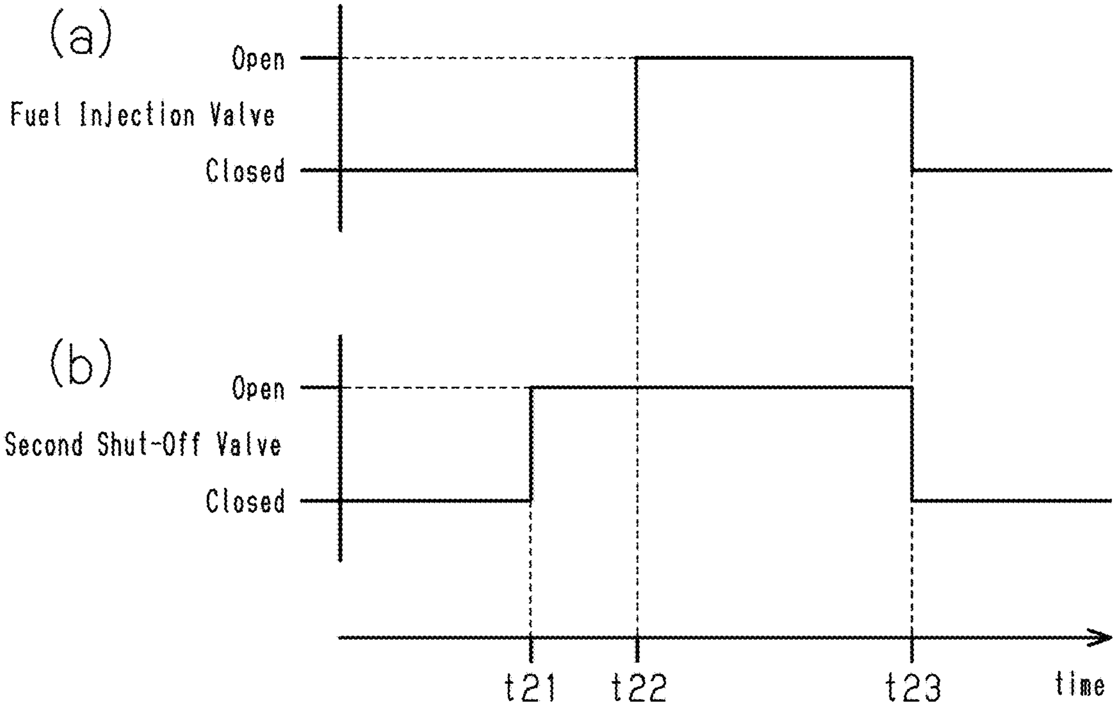
FIG. 5 is a timing diagram showing opening and closing time points of the fuel injection valve and the second shut-off valve in a modification of the embodiment, where part (a) shows the opening and closing time points of the fuel injection valve, and part (b) shows the opening and closing time points of the second shut-off valve.

As shown in part (a) of FIG. 5 and part (b) of FIG. 5, the opening time point (time t21) of the second shut-off valve 22 is set to be earlier than the opening time point (time t22) of each fuel injection valve 15. The closing time point (time t23) of the second shut-off valve 22 may be set to be synchronized with the closing time point of the fuel injection valve 15.

Figure 6:
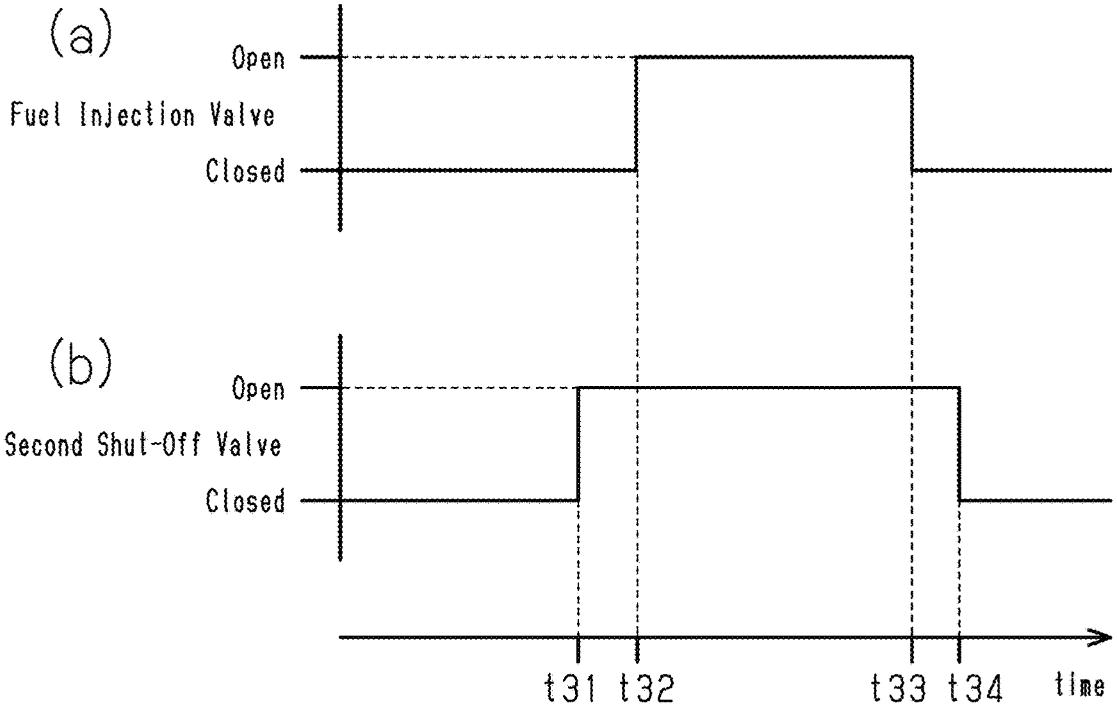
FIG. 6 is a timing diagram showing opening and closing time points of the fuel injection valve and the second shut-off valve in a modification of the embodiment, where part (a) shows the opening and closing time points of the fuel injection valve, and part (b) shows the opening and closing time points of the second shut-off valve.

As shown in part (a) of FIG. 6 and part (b) of FIG. 6, the opening time point (time t31) of the second shut-off valve 22 is set to a point in time earlier than the opening time point (time t32) of each fuel injection valve 15. The closing time point (time t34) of the second shut-off valve 22 may be set to a point in time later than the closing time point (time t33) of the fuel injection valves 15.

Figure 7:
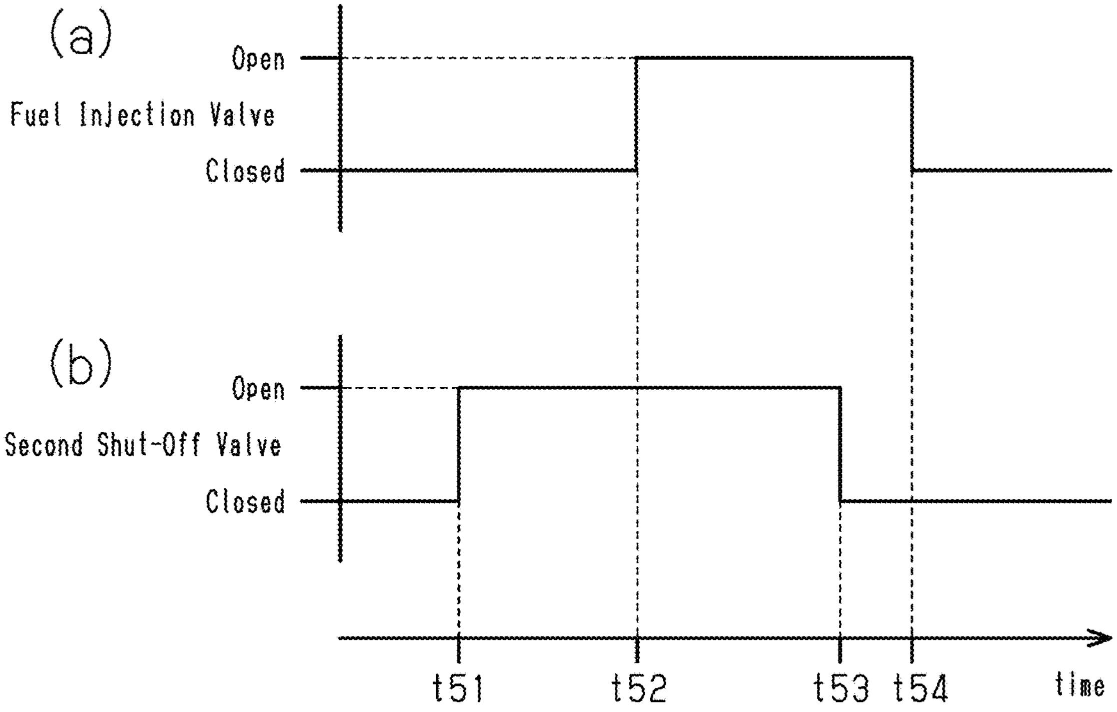
FIG. 7 is a timing diagram showing opening and closing time points of the fuel injection valve and the second shut-off valve in a modification of the embodiment, where part (a) shows the opening and closing time points of the fuel injection valve, and part (b) shows the opening and closing time points of the second shut-off valve.

As shown in part (a) of FIG. 7 and part (b) of FIG. 7, the opening time point (time t51) of the second shut-off valve 22 is set to a point in time earlier than the opening time point (time t52) of each fuel injection valve 15. The closing time point (time t53) of the second shut-off valve 22 may be set to a point in time earlier than the closing time point (time t54) of the fuel injection valves 15.

Figure 8:
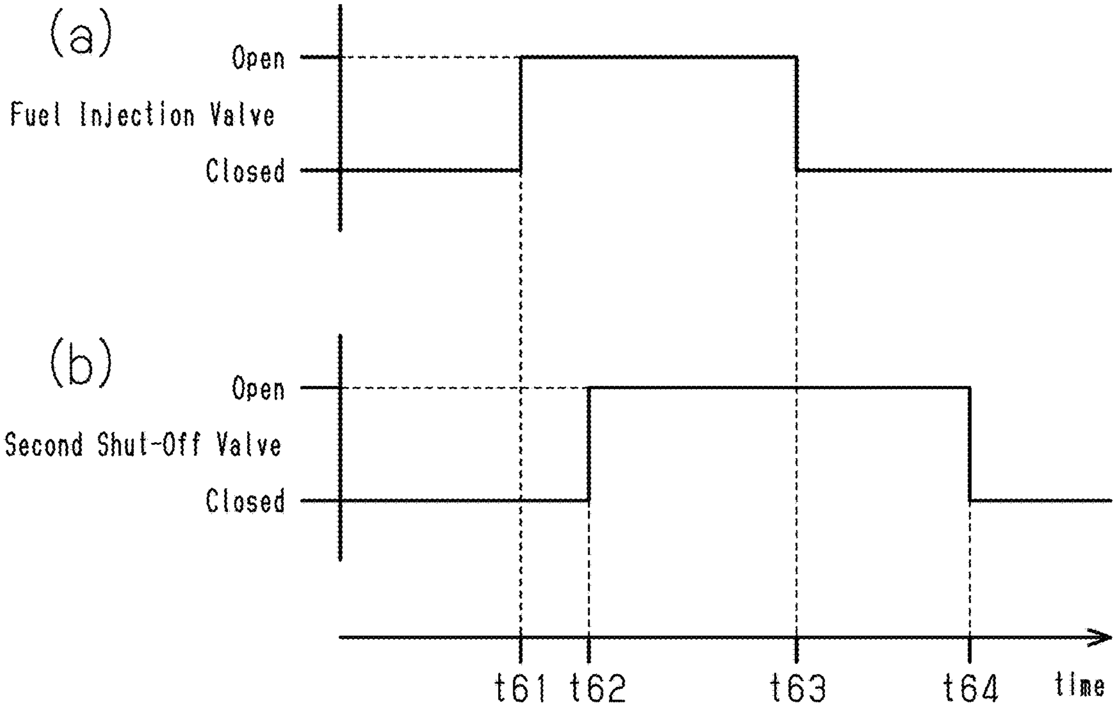
FIG. 8 is a timing diagram showing opening and closing time points of the fuel injection valve and the second shut-off valve in a modification of the embodiment, where part (a) shows the opening and closing time points of the fuel injection valve, and part (b) shows the opening and closing time points of the second shut-off valve.

As shown in part (a) of FIG. 8 and part (b) of FIG. 8, the opening time point (time t62) of the second shut-off valve 22 is set to a point in time later than the opening time point (time t61) of each fuel injection valve 15. The closing time point (time t64) of the second shut-off valve 22 may be set to a point in time later than the closing time point (time t63) of the fuel injection valves 15.

The drive time Tdt, which is the valve opening period of the second shut-off valve 22, is set so that a fuel amount X injected during the valve opening period of each fuel injection valve 15 and a fuel amount Y passing through the second shut-off valve 22 during the valve opening period of the second shut-off valve 22 become the same. In addition, the fuel amount Y may be larger than the fuel amount X, or the fuel amount Y may be smaller than the fuel amount X. In this modification as well, the pressure fluctuation of the fuel supplied to each fuel injection valve 15 can be suppressed as compared with the case where the opening and closing operation of the second shut-off valve 22 is performed such that the valve opening period of the fuel injection valve 15 and the valve opening period of the second shut-off valve 22 do not overlap.

A value obtained by converting the drive time Tdt into a crank angle based on the engine rotation speed NE at that time may be calculated. The calculated value may be used as a drive period Tdtcr. The crank angle after the drive period Tdter from the drive starting time point Tds may be calculated as the drive ending time point Tde. When the crank angle of the crankshaft reaches the drive ending time point Tde, the controller 100 may stop the supply of fuel to the delivery pipe 60 by stopping the energization of the second shut-off valve 22 and closing the second shut-off valve 22.

The fuel of the internal combustion engine 10 is hydrogen gas, which is a gaseous fuel, but may be another gaseous fuel such as compressed natural gas.

The fuel of the internal combustion engine 10 is a gas fuel, but may be a liquid fuel.

The controller 100 includes the CPU 110 and the memory 120 and configured to execute software processing. However, this is merely an example. For example, the controller 100 may include a dedicated hardware circuit (e.g. an application specific integrated circuit: ASIC) that executes at least part of the software processing executed in the above-described embodiment. That is, the controller 100 may be modified to have any one of the following configurations (a) to (c). (a) A configuration including a processor that executes all of the above-described processes according to programs and a program storage device such as a memory that stores the programs. (b) A configuration including a processor and a program storage device that execute part of the above-described processes according to the programs and a dedicated hardware circuit that executes the remaining processes. (c) A configuration including a dedicated hardware circuit that executes all of the above-described processes. Multiple software circuits each including a processor and a program storage device and multiple dedicated hardware circuits may be provided. That is, the above processes may be executed in any manner as long as the processes are executed by processing circuitry that includes at least one of a set of one or more software circuits and a set of one or more dedicated hardware circuits. The program storage device, which is a computer-readable medium, includes any type of media that is accessible by general-purpose computers and dedicated computers.

Various changes in form and details may be made to the examples above without departing from the spirit and scope of the claims and their equivalents. The examples are for the sake of description only, and not for purposes of limitation. Descriptions of features in each example are to be considered as being applicable to similar features or aspects in other examples. Suitable results may be achieved if sequences are performed in a different order, and/or if components in a described system, architecture, device, or circuit are combined differently, and/or replaced or supplemented by other components or their equivalents. The scope of the disclosure is not defined by the detailed description, but by the claims and their equivalents. All variations within the scope of the claims and their equivalents are included in the disclosure.

What is claimed is:

1. A controller configured to control an internal combustion engine, wherein the internal combustion engine includes: a tank that stores fuel, a fuel injection valve that is provided on the internal combustion engine and supplies fuel to a cylinder, a fuel passage that connects the tank to the fuel injection valve, and an electromagnetic valve that is provided in the fuel passage so as to selectively open and close the fuel passage, in response to a request to operate at idle, the controller is configured to perform a fuel pressure control of adjusting a fuel pressure downstream of the electromagnetic valve in a flow direction of fuel in the fuel passage to a prescribed pressure lower than a fuel pressure upstream of the electromagnetic valve by first closing the electromagnetic valve until the fuel pressure downstream of the electromagnetic valve decreases to the prescribed pressure, then repeatedly performing opening and closing operations of the electromagnetic valve, the controller comprises processing circuitry, and the processing circuitry is configured to execute a process of setting opening and closing time points of the electromagnetic valve such that a valve opening period of the electromagnetic valve during execution of the fuel pressure control overlaps with a valve opening period of the fuel injection valve.

2. The controller according to claim 1, wherein the valve opening period of the electromagnetic valve is set such that an amount of fuel injected during the valve opening period of the fuel injection valve is equal to an amount of fuel passing through the electromagnetic valve during the valve opening period of the electromagnetic valve.

3. The controller according to claim 1, wherein an opening time point of the electromagnetic valve is set to be synchronized with an opening time point of the fuel injection valve.

4. The controller according to claim 3, wherein a closing time point of the electromagnetic valve is set to be later than that of the fuel injection valve.

5. The controller according to claim 1, wherein a closing time point of the electromagnetic valve is set to be synchronized with a closing time point of the fuel injection valve.

6. The controller according to claim 5, wherein an opening time point of the electromagnetic valve is set to be earlier than that of the fuel injection valve.

7. The controller according to claim 1, wherein the fuel passage includes a pressure reducing valve, and the electromagnetic valve is provided downstream of the pressure reducing valve in a flow direction of fuel in the fuel passage.

8. The controller according to claim 1, wherein the internal combustion engine uses hydrogen gas as a fuel.

* * * * *